United States Patent [19]

Kurokawa et al.

[11] Patent Number: 4,723,066

[45] Date of Patent: Feb. 2, 1988

[54] APPARATUS FOR HEATING PROCESSING LIQUID

[75] Inventors: Toshio Kurokawa; Hideo Iwasaki, both of Kanagawa; Kazushige Uenaka, Tokyo; Haruo Takase, Kanagawa, all of Japan

[73] Assignee: Fuji Photo Film Co., Ltd., Kanagawa, Japan

[21] Appl. No.: 795,137

[22] Filed: Nov. 5, 1985

[30] Foreign Application Priority Data

Nov. 5, 1984 [JP] Japan .................... 59-232588
Aug. 9, 1985 [JP] Japan ................ 60-123372[U]

[51] Int. Cl.⁴ .............................. H05B 3/02
[52] U.S. Cl. .................... 219/331; 219/333; 219/335; 374/112; 374/114
[58] Field of Search ............ 219/331, 333, 335, 336, 219/523; 73/295; 374/102, 112, 114

[56] References Cited

U.S. PATENT DOCUMENTS

| | | | |
|---|---|---|---|
| 3,947,656 | 3/1976 | Lodi | 219/331 X |
| 4,327,281 | 4/1982 | Jager et al. | 219/331 X |
| 4,358,667 | 11/1982 | Johnson et al. | 219/331 |
| 4,480,174 | 10/1984 | Hummel | 219/331 |
| 4,513,616 | 4/1985 | Bezard et al. | 73/295 |
| 4,553,024 | 11/1985 | Findlay | 219/331 X |
| 4,609,913 | 9/1986 | Arbogast et al. | 73/295 X |

Primary Examiner—Robert L. Spruill
Assistant Examiner—Steven P. Weihrouch
Attorney, Agent, or Firm—Sughrue, Mion, Zinn, Macpeak, and Seas

[57] ABSTRACT

An apparatus for heating a processing liquid has a heater for heating the processing liquid and a temperature sensor for detecting the temperature of the liquid. The heater and the sensor are housed in a protective housing made of a metal or a ceramic material. Since the heater and the temperature sensor are provided together in one unit, the mounting of the apparatus on a processing tank is facilitated. In addition, since the output of the temperature sensor changes in accordance with whether the liquid level of the processing liquid is above or below the position to the temperature sensor, it is also possible to detect the liquid level from the change in the output of the temperature sensor.

4 Claims, 7 Drawing Figures

APPARATUS FOR HEATING PROCESSING LIQUID

BACKGROUND OF THE INVENTION

1. Field of the Invention

The present invention relates to an apparatus for heating a processing liquid. More particularly, the present invention pertains to an apparatus which heats a processing liquid, such as a developer employed in a photographic development machine, to a predetermined temperature and which is also capable of detecting the temperature of the processing liquid.

2. Description of the Related Art

In a color photograph developing machine, the temperature of the developer used therein needs to be maintained between 37° C. and 38° C. For this reason, it is conventional practice to employ a processing liquid heating apparatus which detects the temperature of the developer by means of a temperature sensor and which heats as well as maintains the developer at a target temperature by employing a heater which is provided independently of the sensor.

Accordingly, the conventional processing liquid heating apparatus in which the temperature sensor and the heater mounted on the developing tank of the development machine are separate from each other suffers from the disadvantages that the mounting and wiring operations for these devices are complicated and that management of the heating apparatus involves troublesome work.

SUMMARY OF THE INVENTION

In view of the above-described disadvantages, it is an object of the present invention to provide a processing liquid heating apparatus in which the heater and the temperature sensor are integrated with each other.

It is another object of the present invention to provide a processing liquid heating apparatus which is solid and firm and can be easily handled and in which the temperature sensor is not directly affected by the heat generated from the heater.

It is still another object of the present invention to provide a processing liquid heating apparatus which heats a processing liquid and detects the temperature of the liquid and which is also capable of detecting the level of the processing liquid.

To these ends, the present invention provides a processing liquid heating apparatus in which means for heating a processing liquid and means for detecting the temperature of the liquid are housed in the same housing means.

Since the heating means and the temperature detecting means are housed in a single housing means, it is possible according to the present invention to reduce the production cost, simplify the operation of mounting the apparatus on a processing tank, and facilitate the wiring operation.

As the housing means, a protective housing made of a metal or a ceramic material may be employed. However, a ceramic protective housing is easily cracked in the case of certain production methods and certain methods of use, and there is therefore a risk of a processing liquid entering the ceramic protective housing through a cracked portion, which occurrence would adversely affect the accuracy of the sensor and the operation performance of the heater.

Therefore, a processing liquid heating apparatus according to another aspect of the present invention comprises: a metallic outer casing with one open end; a heating element disposed inside the outer casing and on the side thereof which is closer to the bottom; a heat conductor interposed between the heating element and the inner wall of the outer casing; a temperature sensor disposed inside the outer casing and on the side thereof which is closer to the open end than the heating element, the sensor being spaced from the heating element; and a heat insulator disposed such as to fill the space defined between the heating element, the temperature sensor and the inner wall of the outer casing.

By virtue of the above arrangement, the heating element and the temperature sensor are protected by the metallic outer casing, so that the heating apparatus becomes solid and firm as a whole and it is possible to facilitate the handling of the apparatus and to reliably shut off both the heater and the sensor from the processing liquid. Since the heat insulator is interposed between the temperature sensor and the heater, the sensor is not directly affected by the heat generated from the heater, and it is therefore possible to accurately measure the temperature of the processing liquid through the outer casing.

The heating element is preferably wound around the outer periphery of an unglazed ceramic material, and lead wires of the heating element are led out from the open end of the outer casing. The heat conductor is interposed between the outer periphery of the heating element and the inner wall of the outer casing for the purpose of speedily transmitting the heat generated from the heating element to the processing liquid through the outer casing. This heat conductor needs to possess electrical insulating properties. For example, silicon, a powdered ceramic material, or magnesia may be employed as the heat conductor.

The temperature sensor is preferably disposed close to the inner wall of the outer casing for the purpose of enabling the temperature of the processing liquid to be easily measured through the outer casing. The heat insulator interposed between the sensor and the heating element may be, for example, a porous ceramic material obtained by sintering a powdered ceramic material. This heat insulator is disposed next to the heating element after it has been mounted in place in the outer casing.

The temperature sensor may be constituted by a thermocouple, a thermistor or other similar means. The sensor can be reliably mounted in place in the outer casing by filling the space between the sensor and the inner wall of the outer casing with a powdered ceramic material or the like which serves as a spacer.

Thus, it is possible according to the present invention to obtain advantages whereby the apparatus has high strength and can be easily handled and the temperature sensor is not affected by the heat generated from the heating element.

To the above-described ends, according to still another aspect of the present invention, the processing liquid heating apparatus, in which the heating means and the temperature detecting means are housed in a single housing means as described above, is further provided with means for judging the level of the processing liquid from a temperature change which is obtained from the output of the temperature detecting means when the heating means is supplied with electric current, or when the supply of electric current to the heating means is suspended. More specifically, when the level of the processing liquid is higher than the position of the temperature detecting means ("full level"), the portion of the outer casing at which the temperature detecting means is disposed cools down at a higher rate than that in the case where the level of the liquid is lower than the position of the temperature detecting means ("empty level") (i.e., the time required for the output of the temperature detecting means to fall to a predetermined level is relatively short). On the other hand, when the level of the processing liquid is at the "empty level", the above-described portion of the outer casing is heated up at a higher rate than that in the case of the "full level" (i.e., the time required for the output of the temperature detecting means to rise to a predetermined level is relatively short). Accordingly, when the rising time of the output of the temperature detecting means at the time when the heating means is ON is judged to be less than a predetermined value by the liquid level judging means, or when the falling time of this output at the time when the heating means is OFF is judged to be more than a predetermined value, the liquid level is judged to be abnormal (i.e., "empty level"). The rising or falling time may be indirectly measured. For example, it is possible to judge the abnormality of the liquid level from the temperature of the above-described portion of the outer casing, or the rate of temperature change, which is measured when a predetermined period of time has elapsed after the heating means has been turned ON or OFF.

As described above, it is possible according to the present invention to reduce the production cost, since the heating means and the temperature detecting means are housed in the same housing means. In addition, the mounting of the heating apparatus on the processing tank and the wiring operation required for the apparatus are facilitated. Since the apparatus is provided with the liquid level judging means, it is unnecessary to additionally provide any liquid level sensor. Accordingly, it is advantageously possible to further reduce the production cost and facilitate the mounting of the heating apparatus on the processing tank and the wiring operation required for the apparatus.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and in which.

DESCRIPTION OF THE PREFERRED EMBODIMENTS

A first embodiment of the processing liquid heating apparatus according to the present invention in which it is applied to a photographic development machine will be described below with reference to the accompanying drawings.

Figure 2:
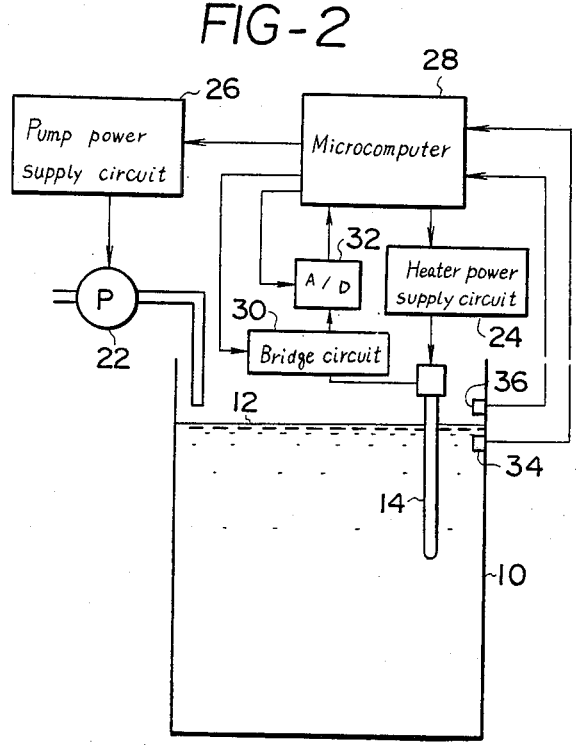
FIG. 2 schematically shows an example of application of the processing liquid heating apparatus in accordance with the first embodiment.

As shown in FIG. 2, a developing tank 10 contains a developer 12 for developing a film (not shown) dipped therein.

Figure 1:
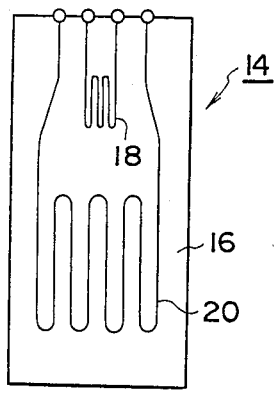
FIG. 1 schematically shows a first embodiment of the processing liquid heating apparatus according to the present invention.

A processing liquid heating apparatus 14 in accordance with the first embodiment of the present invention is mounted on the developing tank 10. In addition, liquid level sensors 34 and 36 are mounted on the developing tank 10. The heating apparatus 14 is, as shown in FIG. 1, formed in such a manner that a temperature measuring resistor 18 and a heater 20 are buried in a ceramic protective housing 16 and in close proximity to each other. In this first embodiment, the resistor 18 is disposed above the heater 20 as viewed in FIG. 1.

The developer 12 in the tank 10 is replenished through a pump 22.

The heater 20 and the pump 22 are supplied with electric power from a heater power supply circuit 24 and a pump power supply circuit 26, respectively. The respective output voltages of the circuits 24 and 26 are ON/OFF switched by means of a microcomputer 28.

The temperature measuring resistor 18 constitutes a bridge circuit 30. An unbalanced voltage from the circuit 30 is input to an A/D converter 32 where it is converted into a digital signal, which is then input to the microcomputer 28. The bridge circuit 30 is supplied with an input voltage from the microcomputer 28.

The microcomputer 28 is also supplied with, as inputs, signals respectively delivered from the liquid level sensors 34 and 36 which respectively detect lower- and upper-limit levels of the developer 12.

Figure 3:
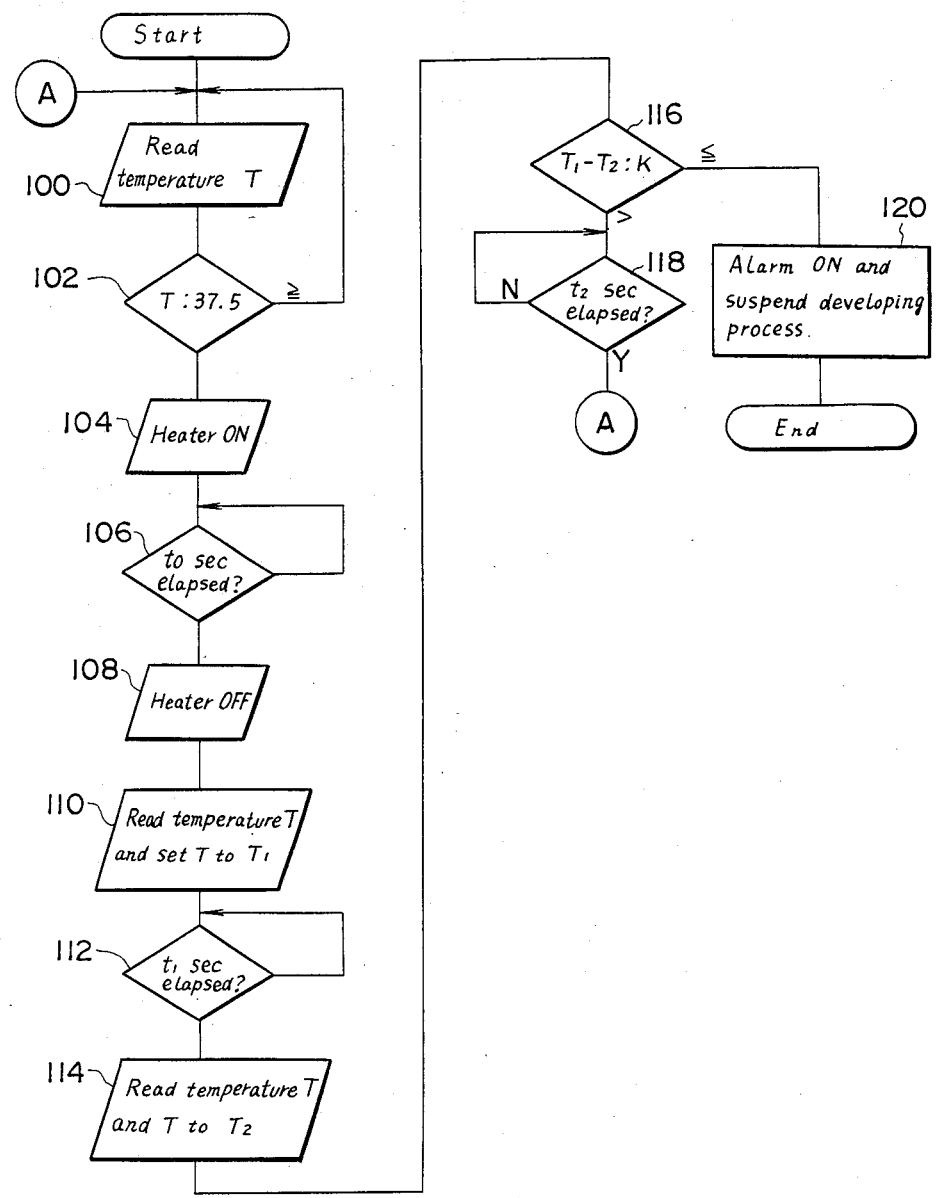
FIG. 3 is a control flow chart employed in the present invention.

The operation of the first embodiment arranged as above will now be described with reference to the control flow chart shown in FIG. 3.

The temperature T which is obtained from the output of the bridge circuit 30 is read (Step 100). If $T \geq 37.5°$ C. (Step 102), the control process returns to Step 100. If $T < 37.5°$ C., the heater power supply circuit 24 is turned ON to supply the output thereof to the heater 20 to thereby heat the developer 12 (Step 104). Then, after $T_0$ sec has elapsed (Step 106), the heater power supply circuit 24 is turned OFF (Step 108), as shown in FIG. 4(A).

Figure 4:
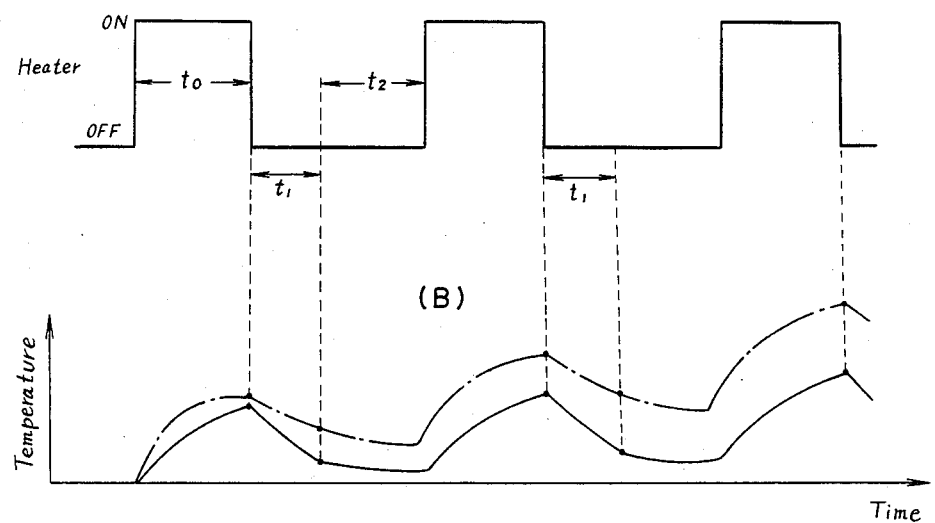
FIG. 4(A) is a waveform chart which shows the way in which the heater incorporated in the apparatus shown in FIG. 1 is ON/OFF controlled.
FIG. 4(B) is a graph which shows the change in the output of the temperature sensor incorporated in the apparatus shown in FIG. 1 in response to the ON/OFF control of the heater.

By heating the developer 12 for $t_0$ sec, the temperature of the portion of the protective housing 16 at which the temperature measuring resistor 18 is disposed rises as shown in FIG. 4(B). In the graph of FIG. 4(B), the solid line represents temperature changes occurring when the level of the developer 12 is higher than the position of the temperature measuring resistor 18 (referred to as the "full level", hereinafter), while the one-dot chain line represents temperature changes occurring when the level of the developer 12 is lower than the position of the temperature measuring resistor 18 (referred to as the "empty level", hereinafter). In other words, the protective housing 16 cools down at a higher rate in the case of the "full level" than that in the case of the "empty level" (i.e., the time required for the output of the bridge circuit 30 to fall to a predetermined level is relatively short).

Next, the temperature T at this time is read and set as $T_1$ (Step 110). Then, after $t_1$ sec has elapsed (Step 112; see FIG. 4(A)), the temperature T at this time is read and set as $T_2$ (Step 114).

Comparison is made between the temperature difference $T_1 - T_2$ and a predetermined value K (K is a constant value) (Step 116). When $T_1 - T_2 > K$, that is, when the rate at which the protective housing 14 cools down is higher than a predetermined value, the liquid level is judged to be "full", and after $t_2$ sec has elapsed (Step 118; see FIG. 4(A)), the control process returns to the first Step 100. When $T_1 - T_2 \leqq K$, that is, when the cooling rate of the protective housing 16 is lower than a predetermined value, the liquid level is judged to be "empty". In this case, an alarm (not shown) is turned ON, and the developing process is suspended (Step 120).

It is to be noted that, in accordance with a timer interruption routine (not shown), when the liquid level sensor 34 turns OFF and the lower-limit level is thereby detected, the pump power supply circuit 26 is turned ON to supply the output thereof to the pump 22. When the liquid level sensor 36 turns ON and the upper-limit level is thereby detected, the circuit 26 is turned OFF. In this case, the flow rate of the developer 12 which is to be replenished is set so small that if there should be a leakage of the developer 12 from the developing tank 10, the "empty level" can be detected although the developer 12 is replenished. The "empty level" is also detected when the pump 22 has a failure and this condition has continued for a predetermined period of time.

It is to be noted that although in the above-described embodiment the liquid level is detected from the rate of temperature change at the time when the heater 20 is OFF, the liquid level may be detected from the rate of temperature change at the time when the heater 20 is ON. In such a case, processing of Steps 106 and 108 is omitted, and after Step 104 has been executed, Step 110 is carried out. When $T_1 - T_2 > K'$ (K' is a predetermined value) is judged in Step 116, the control process proceeds to Step 120, in which the alarm is turned ON, and the developing process is suspended.

The following is a description of a second embodiment of the present invention.

Figure 5:
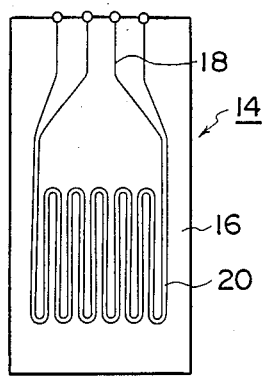
FIG. 5 schematically shows a second embodiment of the processing liquid heating apparatus according to the present invention.

As shown in FIG. 5, in this embodiment, the processing liquid heating apparatus 14 is so formed that the temperature measuring resistor 18 is disposed in close proximity to the heater 20. Accordingly, the rate of upward or downward temperature change at the time when the heater 20 is ON or OFF differs depending upon whether the liquid level is at the "empty level" or the "full level" to a larger extent than that in the case of the first embodiment, which fact enables the liquid level to be judged more accurately.

It is to be noted that the temperature sensor is not necessarily limited to the above-described temperature measuring resistor, and a thermistor, a thermocouple or other similar means may also be employed.

A third embodiment of the present invention will be described below.

Figure 6:
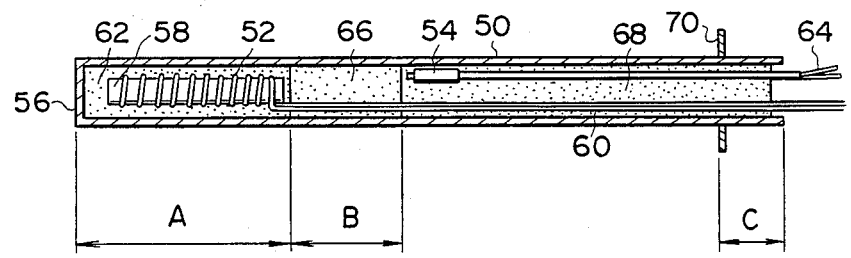
FIG. 6 is a sectional view of a third embodiment of the processing liquid heating apparatus according to the present invention.
Figure 7:
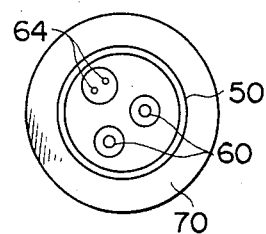
FIG. 7 is an enlarged side elevational view of the apparatus shown in FIG. 6 as viewed from the right-hand side thereof.

FIG. 6 shows a processing liquid heating apparatus in accordance with the third embodiment of the present invention which is employed for heating a developer used in a photographic development machine. In this apparatus, a heating element 52 and a temperature sensor 54 are disposed in an outer casing 50.

The outer casing 50 is made of a metal such as a stainless steel or titanium and has its bottom closed by a bottom plate 56. The outer casing 50 of this embodiment has, for example, an outside diameter of 15 to 17 mm and an overall length of 180 mm.

As the heating element 52, for example, a heating element using a nichrome wire may be employed. In such a case, the nichrome wire is spirally wound around the outer periphery of a winding rod member 58. The rod member 58 is preferably made of an unglazed ceramic material. Lead wires 60 of the heating element 52 are led out from the open end of the outer casing 50 and are connected to a power supply source (not shown).

The heating element 52 is disposed in the substantially axial center of the outer casing 50. The space between the heating element 52 and the inner wall of the outer casing 50 is filled with a silicon filler 62, which has high thermal conductivity. As the silicon filler 62, a powdered ceramic material, magnesia or the like may also be employed. The filler 62 is provided for the purpose of speedily and reliably transmitting the heat generated by the heating element 52 to the outer casing 50 so as to heat the developer. The heating element 52 in this embodiment has an overall length A of about 50 mm.

The temperature sensor 54 is equipped at its distal end portion with a temperature measuring element such as a thermocouple or a thermistor. Lead wires 64 of the sensor 54 are led out from the open end of the outer casing 50 and are connected to a measuring device (not shown).

The temperature sensor 54 is preferably disposed close to the inner wall of the outer casing 50. By so doing, it is possible to speedily measure the temperature of the processing liquid through the outer casing 50. The temperature sensor 54 is spaced from the heating element 52 at a distance B of 30 to 40 mm.

The space between the temperature sensor 54 and the heating element 52 is filled with a heat insulator 66. As the heat insulator 66, it is possible to employ, for example, a porous ceramic material obtained by sintering a powdered ceramic material. The heat insulator 66 is inserted into the outer casing 50 after the heating element 52 has been mounted in place in the casing 50 in such a manner that the heat insulator 66 is located next to the heating element 52.

The space defined between the temperature sensor 54 and the lead wires 64 on one hand and the inner wall of the outer casing 50 on the other is filled with a spacer 68 so that the sensor 54 is positioned in place. As the spacer 68, it is preferable to employ a material with high thermal conductivity in the case where the temperature sensor 54 is not in contact with the inner wall of the outer casing 50, and a heat-insulating material in the case where the temperature sensor 54 is in contact with the inner wall of the outer casing 50.

A flange 70 is secured to that position on the outer periphery of the outer casing 50 which is spaced from the open end of the casing 50 by an appropriate distance C (about 25 mm) as shown in FIG. 6. The flange 70 is used when the outer casing 50 is mounted on the developing tank. In addition, the flange 70 abuts against a portion of the development machine when the outer casing 50 is immersed in the developer, thereby determining the depth by which the processing liquid heating apparatus is immersed into the developer.

In the heating apparatus in accordance with this embodiment arranged as above, the heating element 52 and the temperature sensor 54 are mounted inside the outer casing 50 together with the associated fillers, so that the outside of the apparatus is reliably protected by the outer casing 50. Accordingly, when the heating apparatus is mounted on the development machine, it is possible to reliably protect the heating element 52 and the temperature sensor 54 even when any part of the outer casing 50 collides with an element of the development machine.

When the heating apparatus is immersed in the processing liquid contained in the development machine (not shown) to heat the liquid and measure the temperature thereof, the heating element 52 is supplied with electric power to thereby heat the processing liquid. Since the silicon filler 62 has high thermal conductivity, the heat generated from the heating element 52 is highly efficiently transmitted to the developer through the filler 62 and the outer casing 50, thereby allowing the developer to be heated with high efficiency. Since the heat insulator 66 is interposed between the heating element 52 and the temperature sensor 54, there is no risk of this heat being directly transmitted to the sensor 54 within the outer casing 50.

To maintain the liquid level at a constant value by detecting the level of the processing liquid and sounding an alarm at the time of occurrence of abnormality of the liquid level, or replenishing the processing liquid using a pump when the liquid level is lower than a predetermined value, as described in relation to the arrangement shown in FIG. 2, the heat of the portion of the outer casing 50 at which the heating element 52 is disposed can be transmitted to the temperature sensor 54 through the portion of the casing 50 near the sensor 54, and thus the temperature of that portion of the casing 50 which is heated up at a relatively high rate when the liquid level lowers can be measured.

Since the temperature sensor 54 is disposed in close proximity to the inner wall of the outer casing 50, it is possible to accurately measure the temperature of the developer through the outer casing 50.

It is to be noted that the materials for the silicon filler 62, the heat insulator 66 and the spacer 68, which are employed in the above embodiment, are not necessarily limitative, and other materials may be employed, provided that they have adequate properties similar to those of the materials described above.

What is claimed is:

1. An apparatus for heating a processing liquid and for determining its level comprising:
    means for heating the processing liquid,
    means for detecting the temperature of the processing liquid;
    means for controlling said heating means to maintain said temperature within a predetermined range by ON/OFF controlling a flow of power to said heating means;
    means for housing said heating means and said temperature detecting means; and
    means for judging the level of said processing liquid from a temperature change thereof which is obtained by said temperature detecting means when heating of said processing liquid is effected by said heating means, or when the heating by said heating means is suspended.

2. An apparatus acccording to claim 1, wherein said housing comprises:
    a ceramic protective housing for housing said heating element and said temperature sensor in such a manner that they are located in close proximity to each other.

3. An apparatus according to claim 1, wherein:
    said housing is a metallic outer casing with one open end;
    said heating element is disposed inside said outer casing and on the side thereof which is closer to its bottom;
    a heat conductor is disposed between said heating element and the inner wall of said outer casing;
    said temperature sensor is disposed inside said outer casing and on the side thereof which is closer to the open end than said heating element, said temperature sensor being spaced from said heating element; and
    a heat insulator is disposed such as to fill the space defined between said heating element, said temperature sensor and the inner wall of said outer casing.

4. An apparatus for heating a processing liquid and for determining its level, comprising:
    a metallic outer casing with a bottom and one open end;
    a heating element, for heating the processing liquid, disposed inside said outer casing and closer to said bottom than to said open end;
    a heat conductor interposed between said heating element and the inner wall of said outer casing;
    a temperature sensor, for detecting the temperature of the processing liquid, disposed inside said outer casing closer to the open end than said heating element, said temperature sensor being spaced from said heating element; and
    a heat insulator disposed such as to fill the space defined between said heating element, said temperature sensor and the inner wall of said outer casing;
    means for controlling said heating means to maintain said temperature within a predetermined range by ON/OFF controlling a flow of power to said heating means; and
    means for juding the level of said processing liquid from a temperature change thereof which is obtained from the output of said temperature sensor when said heating element is supplied with electric current, or when the supply of electric current to said heating element is suspended.

* * * * *